(12) United States Patent
Yang

(10) Patent No.: US 12,713,343 B2
(45) Date of Patent: Aug. 18, 2026

(54) METHOD AND APPARATUS FOR DETERMINING ACTIVATION STATE OF TERMINAL

(71) Applicant: Beijing Xiaomi Mobile Software Co., Ltd., Beijing (CN)

(72) Inventor: Xing Yang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 258 days.

(21) Appl. No.: 18/558,478

(22) PCT Filed: May 7, 2021

(86) PCT No.: PCT/CN2021/092241
§ 371 (c)(1),
(2) Date: Nov. 1, 2023

(87) PCT Pub. No.: WO2022/233066
PCT Pub. Date: Nov. 10, 2022

(65) Prior Publication Data
US 2024/0244527 A1 Jul. 18, 2024

(51) Int. Cl.
*H04W 52/02* (2009.01)
*H04W 76/28* (2018.01)

(52) U.S. Cl.
CPC ... *H04W 52/0216* (2013.01); *H04W 52/0235* (2013.01); *H04W 76/28* (2018.02)

(58) Field of Classification Search
CPC ......... H04W 52/0216; H04W 52/0235; H04W 76/28
See application file for complete search history.

(56) References Cited

U.S. PATENT DOCUMENTS

2019/0373647 A1 12/2019 Rugeland et al.
2021/0051587 A1 2/2021 Wu et al.
2021/0306948 A1* 9/2021 Ding ................ H04W 52/0235
2022/0022280 A1* 1/2022 Yu ......................... H04L 1/1819

FOREIGN PATENT DOCUMENTS

CN 111480391 A 7/2020
CN 111556590 A 8/2020
EP 3113548 A1 1/2017
(Continued)

OTHER PUBLICATIONS

International Search Report and Written Opinion of International Application No. PCT/CN2021/092241, dated Jan. 30, 2022, 15 pages.

(Continued)

*Primary Examiner* — Brenda H Pham

(74) *Attorney, Agent, or Firm* — Finnegan, Henderson, Farabow, Garrett & Dunner, L.L.P.

(57) ABSTRACT

A method for determining an activation state of a terminal is performed by a sending terminal. The method includes: determining a state of a first-type local timer on the sending terminal corresponding to a receiving terminal, wherein the receiving terminal is a terminal communicating with the sending terminal via a sidelink; and determining the activation state of the receiving terminal based on the state of the first-type local timer.

10 Claims, 3 Drawing Sheets determining a state of a first-type local timer on the sending terminal corresponding to a receiving terminal, wherein the receiving terminal is a terminal communicating with the sending terminal via a sidelink — S201 determining the activation state of the receiving terminal based on the state of the first-type local timer — S202 stopping a running of the first-type local timer, in response to the sending terminal sending a sidelink discontinuous reception (DRX) medium access control (MAC) control element (CE) to the receiving terminal, wherein the sidelink DRX MAC CE is configured to instruct the receiving terminal to enter an inactive state — S301

(56) References Cited

FOREIGN PATENT DOCUMENTS

WO WO 2021032194 A 2/2021

OTHER PUBLICATIONS

"Consideration on the sidelink DRX for unicast, groupcast and broadcast", Huawei, HiSilicon, 3GPP TSG-RAN WG2 Meeting #112 electronic, R2-2009413, Nov. 2-13, 2020, 8 pages.
Office Action issued by the Patent Office of the Russian Federation Federal Institute of Industrial Property on Jun. 5, 2024, in corresponding Application No. RU 2023130415, 8 pages.
Extended European Search Report Issued in Application No. 21939712.2 dated Jun. 13, 2024, 11 pages.
Notice of Reasons for Refusal issued by the Japanese Patent Office on Sep. 25, 2024, in corresponding Application No. JP 2023-567886, 7 pages.
"On general sidelink DRX design", Intel Cororation, 3GPP TSG RAN WG2 Meeting #112-e, R2-2008978, Electronic meeting, Nov. 2-13, 2020, 8 pages.
Invitation to Respond to Written Opinion for Singapore Patent Application No. 11202308429R, dated Dec. 6, 2025, 11 pages.
Office Action issued by the Korean Intellectual Property Office on May 22, 2026, in corresponding Application No. KR 10-2023-7041868, 14 pages.
"Definition ofthe Active Time in SL DRX", InterDigital Inc., 3GPP RAN WG2 Meeting #113 electronic, R2-2100514, Online, Jan. 2021, 4 pages.

* cited by examiner

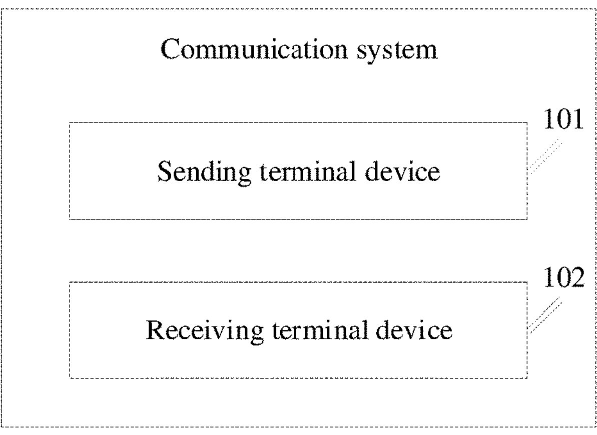

Fig. 1

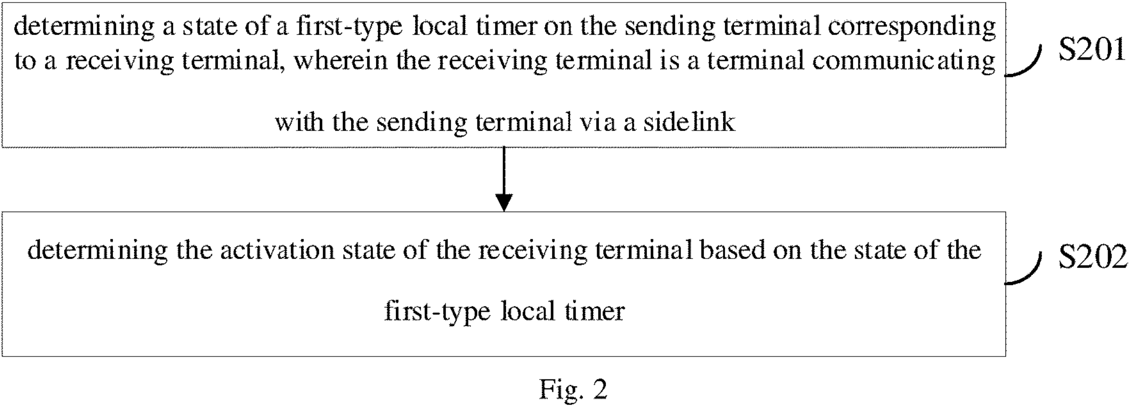

Fig. 2 stopping a running of the first-type local timer, in response to the sending terminal sending a sidelink discontinuous reception (DRX) medium access control (MAC) control element (CE) to the receiving terminal, wherein the sidelink DRX MAC CE is configured to instruct the receiving terminal to enter an inactive state

S301

Fig. 3 stopping a running of the first-type local timer, in response to receiving indication information sent by the receiving terminal, wherein the indication information is sent by the receiving terminal when entering an inactive state

METHOD AND APPARATUS FOR DETERMINING ACTIVATION STATE OF TERMINAL

CROSS-REFERENCE TO RELATED APPLICATION

This application is the US national phase application of International Application No. PCT/CN2021/092241, filed on May 7, 2021, the entire contents of which are incorporated herein by reference.

TECHNICAL FIELD

The disclosure relates to the field of communication technologies, and in particular, to a method and an apparatus for determining an activation state of a terminal.

BACKGROUND

In the related art, half duplex communication is used for sidelink communication between terminals. In order to save power of terminal devices, Discontinuous Reception (DRX) is introduced into the sidelink communication. The terminal determines the activation state of the terminal based on the running time of the local timer, and only monitors the Physical Sidelink Control Channel (PSCCH) in the active state. Therefore, the running state of the corresponding timers of the two terminals for sidelink communication needs to be consistent.

SUMMARY

In a first aspect, embodiments of the present disclosure provide a method for determining an activation state of a terminal, performed by a sending terminal. The method includes:

- determining a state of a first-type local timer on the sending terminal corresponding to a receiving terminal, wherein the receiving terminal is a terminal communicating with the sending terminal via a sidelink;
- determining the activation state of the receiving terminal based on the state of the first-type local timer.

In a second aspect, embodiments of the present disclosure provide a method for determining an activation state of a terminal, performed by a receiving terminal. The method includes:

- sending indication information to a sending terminal, wherein the indication information is configured to indicate that the receiving terminal enters an inactive state, and wherein the sending terminal is a terminal communicating with the receiving terminal via a sidelink.

BRIEF DESCRIPTION OF THE DRAWINGS

The accompanying drawings of the present disclosure is briefly described below.

FIG. 1 is a schematic diagram of an architecture of a communication system provided in embodiments of the present disclosure.

FIG. 2 is a schematic flowchart of a method for determining an activation state of a terminal provided in an embodiment of the present disclosure.

FIG. 3 is a schematic flowchart of a method for determining an activation state of a terminal provided in an embodiment of the present disclosure.

FIG. 4 is a schematic flowchart of a method for determining an activation state of a terminal provided in an embodiment of the present disclosure.

DETAILED DESCRIPTION

Figure 5:
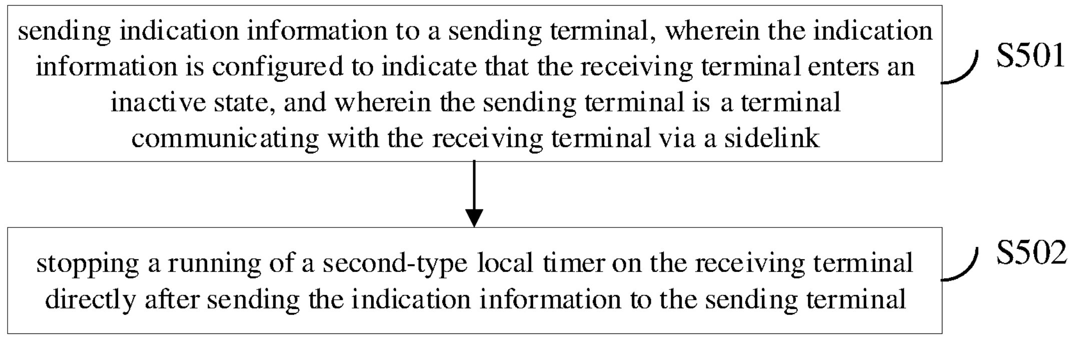
FIG. 5 is a schematic flowchart of a method for determining an activation state of a terminal provided in an embodiment of the present disclosure.

For ease of understanding, the terms involved in this disclosure are first introduced.

1. Discontinuous Reception (DRX)

DRX is a computer term that means discontinuous reception. User equipment (UE) stops monitoring the Physical Sidelink Control Channel (PSCCH) for a period of time. There are two types of DRX. The first is the Integrated Development and Learning Environment (IDLE) DRX, which, as the name suggests, refers to the discontinuous reception when the UE is in the IDLE state. In the IDLE state, there is no longer a Radio Resource Control (RRC) connection or user specific resources, so this mainly involves monitoring call channels and broadcast channels. As long as a fixed period is defined, discontinuous reception can be achieved. However, if the UE wants to monitor user data channels, the UE must first enter the connected state from the IDLE state.

The other is Active DRX, which means the DRX when the UE is in a connected (RRC CONNECTED) state, which can optimize system resource configuration and more importantly, save phone power, without the need for the phone to enter RRC_IDLE mode. For example, some non-real-time applications, such as instant messaging, always exist a period of time, during which the phone does not need to constantly monitor downstream data and related processing, so DRX can be applied to such situations. Additionally, due to the presence of RRC connections in this state, the speed at which UE switches to the connected state is very fast.

2. Media Access Control (MAC)

MAC defines how data frames are transmitted on the medium. In links sharing the same bandwidth, access to the connecting medium is 'first come, first served'. Physical addressing is defined here, and logical topology (the path through which signals pass through physical topology) is also defined here. Line control, error notification (not corrected), frame transmission order, and selectable flow control are also implemented in this sublayer.

3. Control Element (CE)

After long term evolution (LTE), there are multiple communication paths in the MAC layer of the network. This means special MAC structures that carries special control information. These special MAC structures carrying control information are called MAC CEs, which means media access control layer control elements.

4. Sidelink

Sidelink is an important branch of cellular Internet of Things technology, and is divided into two modes: one is called sidelink discovery between UEs, and the other is called sidelink communication between UEs. Sidelink utilizes uplink resources and uplink physical channels similar to cellular networks for data exchange and transmission.

However, there are also differences, such as in terms of transmission strategy, sidelink restricts single cluster transmission for all sidelink physical channels, and inserts a symbol gap (1 symbol gap) after subframe transmission of each sidelink.

In order to better understand the method for determining an activation state of a terminal disclosed in embodiments of the present disclosure, the communication system applicable to the embodiments of the present disclosure will be described below.

As shown in FIG. 1, FIG. 1 is a schematic diagram of an architecture of a communication system provided in embodiments of the present disclosure. The communication system may include, but is not limited to, one terminal device. The number and form of devices shown in FIG. 1 are for example only and do not constitute a limitation on the embodiments of the present disclosure. In practical applications, it may include two or more terminal devices. The communication system shown in FIG. 1 takes a sending terminal device 101 and a receiving terminal device 102 as an example.

It should be noted that the technical solutions of embodiments of the present disclosure can be applied to various communication systems, for example, long term evolution (LTE) systems, 5th generation (5G) mobile communication systems, 5G new radio (NR) systems, or other new mobile communication systems in the future.

The sending terminal device 101 and receiving terminal device 102 in the embodiment of this disclosure may be entities on the user side for receiving or sending signals, such as mobile phones. The sending terminal device 101 and receiving terminal device 102 may also be referred to as terminals, user equipment (UEs), mobile stations (MSs), mobile terminals (MTs), and so on. Terminal devices may be cars with communication capabilities, smart cars, mobile phones, wearable devices, tablets, computers with wireless transceiver capabilities, virtual reality (VR) terminal devices, augmented reality (AR) terminal devices, wireless terminal devices in industrial control, and wireless terminal devices in self driving, wireless terminal devices in remote medical surgery, wireless terminal devices in smart grid, wireless terminal devices in transportation safety, wireless terminal devices in smart city, and wireless terminal devices in smart home. Embodiments of the present disclosure do not limit the specific technology and device form adopted by the terminal device.

It could be understood that the communication system described in the embodiments of the present disclosure is intended to provide a clearer explanation of the technical solutions of the embodiments of the present disclosure, and does not constitute a limitation on the technical solutions proposed in the embodiments of the present disclosure. As ordinary technical personnel in the art know, with the evolution of the system architecture and the emergence of new business scenarios, the technical solutions proposed in the embodiments of the present disclosure are also applicable to similar technical problems.

It can be understood that multiple schemes in the embodiments of the present disclosure can be implemented separately or in combination, and the present application does not limit this.

The following is a detailed introduction to a method and an apparatus for determining an activation state of a terminal proposed in this application, combined with the accompanying drawings.

As those skilled in the art can understand, the technical solution of each embodiment can be implemented separately or together with any other technical solution in the disclosed embodiments, which is not limited in embodiments of the present disclosure.

FIG. 2 is a schematic flowchart of a method for determining an activation state of a terminal provided in an embodiment of the present disclosure. The method is performed by a sending terminal. As shown in FIG. 2, the method includes followings.

At S201, a state of a first-type local timer on the sending terminal corresponding to a receiving terminal is determined, in which the receiving terminal is a terminal communicating with the sending terminal via a sidelink.

When two terminals communicate via a sidelink, a half duplex communication mode is used, which means that sending and reception of data on the sidelink and sending of data on the uplink channel of the air interface are the half duplex communication mode. One terminal can send or transmit data to the other terminal, but they cannot simultaneously transmit and send data.

In order to save power of the terminal, it is necessary to maintain the consistency of the state of the timer of the terminal as much as possible, that is, to maintain the consistency of the activation state of both terminals. When the timer corresponding to the terminal is in the running state, the terminal is in the active state, and when the timer corresponding to the terminal is in the stopped state, the terminal is in the inactive state.

In some implementations, the sending terminal includes two types of local timers, among which the first-type local timer is used to determine the state of the receiving terminal communicating with the sending terminal via the sidelink. The second-type local timer is used to determine the state of the sending terminal itself. To determine the activation state of the receiving terminal communicating with the sending terminal via the sidelink, in embodiments of this disclosure, it is necessary to obtain the state of the first-type local timer on the sending terminal corresponding to the receiving terminal.

Optionally, the timer includes one or more of the following timers: an inactive timer, a wakeup timer, or a retransmission timer.

At S202, the activation state of the receiving terminal is determined according to the state of the first-type local timer.

As the first-type local timer is used to determine the state of the receiving terminal communicating with the sending terminal via the sidelink, after obtaining the state of the first-type local timer, the activation state of the receiving terminal can be determined based on the state of the first-type local timer. In some implementations, in response to the first-type local timer being in the running state, it is determined that the receiving terminal is in the active state. In some implementations, in response to the first-type local timer being in a stopped state, the receiving terminal is in an inactive state.

In order to keep the timers of the two terminals in sidelink communication synchronized, optionally, in response to the first-type local timer being in the running state, that is, when the receiving terminal is in the active state, it is necessary to maintain the continuous running of the second-type local timer on the receiving terminal corresponding to the sending terminal.

Optionally, in response to the first-type local timer being in a stopped state, that is, when the receiving terminal is in the inactive state, it is necessary to stop the running of the second-type local timer on the receiving terminal corresponding to the sending terminal.

The method for determining the activation state of a terminal proposed in embodiments of the present disclosure determines the state of the first-type local timer on the sending terminal corresponding to the receiving terminal, wherein the receiving terminal is a terminal communicating with the sending terminal via the sidelink, and further determines the activation state of the receiving terminal based on the state of the first-type local timer. In this application, since the activation state of the peer devices for sidelink communication can be determined, it is possible to avoid inconsistent judgments of the activation state between the two devices performing sidelink communication, thereby reducing data transmission errors and reducing power consumption.

FIG. 3 is a schematic flowchart of a method for determining an activation state of a terminal according to an embodiment of the present disclosure. The method is performed by a sending terminal. As shown in FIG. 3, method includes followings.

At S301, a running of the first-type local timer is stopped, in response to the sending terminal sending a sidelink discontinuous reception (DRX) medium access control (MAC) control element (CE) to the receiving terminal, wherein the sidelink DRX MAC CE is configured to instruct the receiving terminal to enter an inactive state.

In some implementations, the sending terminal sends a Sidelink DRX MAC CE to the receiving terminal, instructing the receiving terminal to enter the inactive state. After receiving the Sidelink DRX MAC CE, the receiving terminal will enter the inactive state. To maintain timer synchronization, when the receiving terminal enters the inactive state, correspondingly, it is necessary for the sending terminal to stop the running of the first-type local timer on the sending terminal corresponding to the receiving terminal. That is to say, when the sending terminal sends the Sidelink DRX MAC CE to the receiving terminal, it is necessary to change the state of the first-type local timer to the stopped state.

Optionally, in order to further reduce errors, the method for determining the activation state of the terminal provided in this disclosure further includes: stopping the running of the first-type local timer, in response to the sending terminal sending the sidelink DRX MAC CE to the receiving terminal and receiving feedback information sent from the receiving terminal indicating successful reception of the sidelink DRX MAC CE. That is to say, after the sending terminal sends the Sidelink DRX MAC CE to the receiving terminal, the running of the first-type local timer does not immediately stop. After receiving the Sidelink DRX MAC CE, the receiving terminal sends feedback information of successful reception to the sending terminal. The sending terminal determines that the receiving terminal enters the inactive state based on the received feedback information, and then controls the first-type local timer to stop running.

In the method for determining the activation state of the terminal proposed in the embodiments of the present disclosure, after the sending terminal sends the Sidelink DRX MAC CE to the receiving terminal, wherein the Sidelink DRX MAC CE is configured to instruct the receiving terminal to enter the inactive state, accordingly, the sending terminal stops the running of the first-type timer, and when the first-type timer is in the stopped state, the sending terminal can determine the activation state of the receiving terminal. In this disclosure, since the activation state of the peer devices for sidelink communication can be determined, it is possible to avoid inconsistent judgments of the activation state between the two devices performing sidelink communication, thereby reducing data transmission errors and reducing power consumption.

FIG. 4 is a schematic flowchart of a method for determining an activation state of a terminal according to an embodiment of the present disclosure. The method is performed by a sending terminal. As shown in FIG. 4, the method includes followings.

At S401, a running of the first-type local timer is stopped, in response to receiving indication information sent by the receiving terminal, wherein the indication information is sent by the receiving terminal when entering the inactive state.

When the receiving terminal enters the inactive state, it sends indication information to the sending terminal. After receiving the indication information, the sending terminal determines that the receiving terminal is in the inactive state based on the indication information, and stops the running of the first-type local timer in the sending terminal corresponding to the receiving terminal.

Optionally, the sending terminal may receive the indication information sent by the receiving terminal through MAC CE or RRC signaling.

Optionally, the receiving terminal may also include two types of local timers, among which the first-type local timer is used to determine the state of the sending terminal communicating with the receiving terminal via the Sidelink. The second-type local timer is used to determine the state of the receiving terminal itself. When the receiving terminal cannot monitor the sidelink communication channel during running of the second-type local timer, it can enter the inactive state and send the indication information to the sending terminal.

Optionally, the indication information is triggered and sent by the receiving terminal when it is unable to monitor the sidelink communication channel during the running of its own second-type local timer.

The method for determining the activation state of the terminal proposed in embodiments of the present disclosure can determine that the first-type local timer needs to be in the stopped state based on the indication information after receiving the indication information fed back by the receiving terminal, thereby stopping the running of the first-type local timer. In this disclosure, when the receiving terminal is in the inactive state, the running of the first-type local timer on the sending terminal can be stopped, which can keep the activation state of the two devices in sidelink communication consistent, thereby reducing data transmission errors and reducing power consumption.

FIG. 5 is a schematic flowchart of a method for determining an activation state of a terminal according to an embodiment of the present disclosure. The method is performed by a receiving terminal. As shown in FIG. 5, the method includes followings.

At S501, indication information is sent to a sending terminal, wherein the indication information is configured to indicate that the receiving terminal enters an inactive state, and wherein the sending terminal is a terminal communicating with the receiving terminal via a sidelink.

In embodiments of the present disclosure, if the receiving terminal enters the inactive state, the indication information is sent to the sending terminal to indicate that the activation state of the receiving terminal is inactive. In some implementations, the second-type local timer on the receiving terminal can be used to determine the activation state of the receiving terminal itself. In response to the fact that the receiving terminal is unable to monitor the sidelink communication channel during the running of its second-type local timer, the sending terminal can be triggered to send the indication information. That is to say, if the receiving terminal is unable to monitor the sidelink channel during the running of its second-type timer due to sidelink transmission or Uu transmission, it can be triggered to send the indication information to the sending terminal.

At S502, a running of a second-type local timer on the receiving terminal is directly stopped after sending the indication information to the sending terminal.

In embodiments of the present disclosure, the indication information is sent to the transmitting terminal to indicate that the receiving terminal has entered the inactive state, and accordingly, the sending terminal will stop the running of the first type timer on the sending terminal based on the indication information. In order to ensure that the activation state of the two terminals in sidelink communication is consistent, the receiving terminal also needs to stop its second-type local timer.

In some implementations, the method for determining the activation state of the terminal provided in this disclosure further includes the following steps. After sending the indication information to the sending terminal, the receiving terminal does not immediately stop the second-type local timer, but waits for the feedback information fed back by the sending terminal for indicating successful reception of the indication information. When the feedback information fed back by the sending terminal for indicating successful reception of the indication information is received, the receiving terminal stops the running of the second-type local timer on the receiving terminal.

In some implementations, the method for determining the activation state of the terminal provided in embodiments of the present disclosure may further include the following steps: receiving a sidelink DRX MAC CE sent by the sending terminal, wherein the sidelink DRX MAC CE is configured to instruct the receiving terminal to enter the inactive state; or receiving a sidelink DRX MAC CE sent by the sending terminal, and sending feedback information to the sending terminal when successfully receiving the sidelink DRX MAC CE. The introduction of Sidelink DRX MAC CE can be found in the relevant content of each embodiment of this disclosure, and will not be repeated here.

The method for determining the activation state of the terminal proposed in embodiments of the present disclosure can stop the running of the second-type local timer on the receiving terminal when the receiving terminal is in the inactive state, and instruct the sending terminal to stop its own first-type timer through the indication information, so as to keep the activation state of the two devices in sidelink communication consistent, thereby reducing data transmission errors and reducing power consumption.

Embodiments of the present disclosure further provide a communication device. The communication device may be a terminal device (such as the terminal device in the aforementioned method embodiments), or a device in the terminal device, or a device that can be matched and used with the terminal device.

Figure 6:
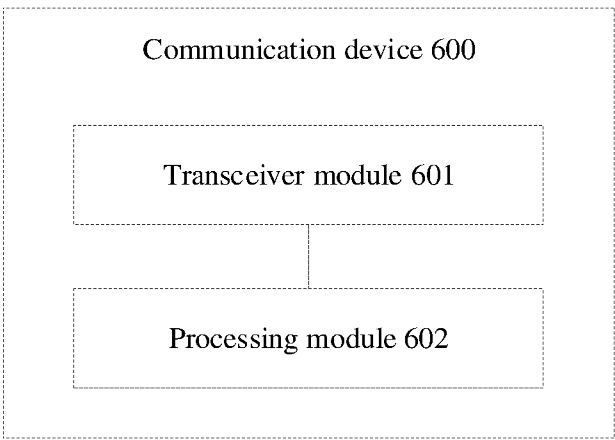
FIG. 6 is a schematic flowchart of a method for determining an activation state of a terminal provided in an embodiment of the present disclosure.

FIG. 6 is a block diagram of a communication device according to an embodiment of the present disclosure. As shown in FIG. 6, the communication device 600 for determining an activation state of a terminal includes a transceiver module 601 and a processing module 602, wherein the transceiver module 601 may include a sending module and/or a receiving module, the sending module for implementing the sending function, the receiving module for implementing the receiving function, and the transceiver module 601 for implementing the sending and/or receiving function.

The communication device 600 is a sending device.

The processor module 602 is configured to determine a state of a first-type local timer on the sending terminal corresponding to a receiving terminal, wherein the receiving terminal is a terminal communicating with the sending terminal via a sidelink; and determine the activation state of the receiving terminal based on the state of the first-type local timer.

The processing module 602 is further configured to: determine that the receiving terminal is in an active state, in response to the first-type local timer being in a running state; or determine that the receiving terminal is in an inactive state, in response to the first-type local timer being in a stopped state.

The processing module 602 is further configured to: stop a running of the first-type local timer, in response to the sending terminal sending a sidelink discontinuous reception (DRX) medium access control (MAC) control element (CE) to the receiving terminal, wherein the sidelink DRX MAC CE is configured to instruct the receiving terminal to enter an inactive state; or stop a running of the first-type local timer, in response to the sending terminal sending a sidelink DRX MAC CE to the receiving terminal and receiving feedback information sent from the receiving terminal indicating successful reception of the sidelink DRX MAC CE.

The processing module 602 is further configured to: stop a running of the first-type local timer, in response to receiving indication information sent by the receiving terminal, wherein the indication information is sent by the receiving terminal when entering an inactive state.

Optionally, the indication information is triggered and sent by the receiving terminal when it is unable to monitor a sidelink communication channel during a running of its own second-type local timer.

Optionally, the timer includes one or more of following timers: an inactive timer, a wakeup timer or a retransmission timer.

The communication device 600 is a receiving device.

The transceiver module 601 is configured to send indication information to a sending terminal, wherein the indication information is configured to indicate that the receiving terminal enters an inactive state, and wherein the sending terminal is a terminal communicating with the receiving terminal via a sidelink.

The processing module 602 is configured to stop a running of a second-type local timer on the receiving terminal directly after sending the indication information to the sending terminal; or receiving feedback information fed back by the sending terminal indicating successful reception of the indication information, and stopping a running of a second-type local timer on the receiving terminal.

The transceiver module 601 is further configured to send the indication information to the sending terminal, in response to the receiving terminal being unable to monitor a sidelink communication channel during a running of the second-type local timer.

The transceiver module 601 is further configured to: receive a sidelink DRX MAC CE sent by the sending terminal, wherein the sidelink DRX MAC CE is configured to instruct the receiving terminal to enter the inactive state; or receive a sidelink DRX MAC CE sent by the sending terminal, and send feedback information to the sending terminal when successfully receiving the sidelink DRX MAC CE.

Optionally, the timer includes one or more of an inactive timer, a wakeup timer, or a retransmission timer.

The communication device provided in this disclosure determines the state of the first-type local timer on the sending terminal corresponding to the receiving terminal, wherein the receiving terminal is a terminal communicating with the sending terminal via the Sidelink, and further determines the activation state of the receiving terminal based on the state of the first-type local timer. In this disclosure, since the activation state of the peer devices for sidelink communication can be determined, it is possible to avoid inconsistent judgments of the activation state between the two devices performing sidelink communication, thereby reducing data transmission errors and reducing power consumption.

Figure 7:
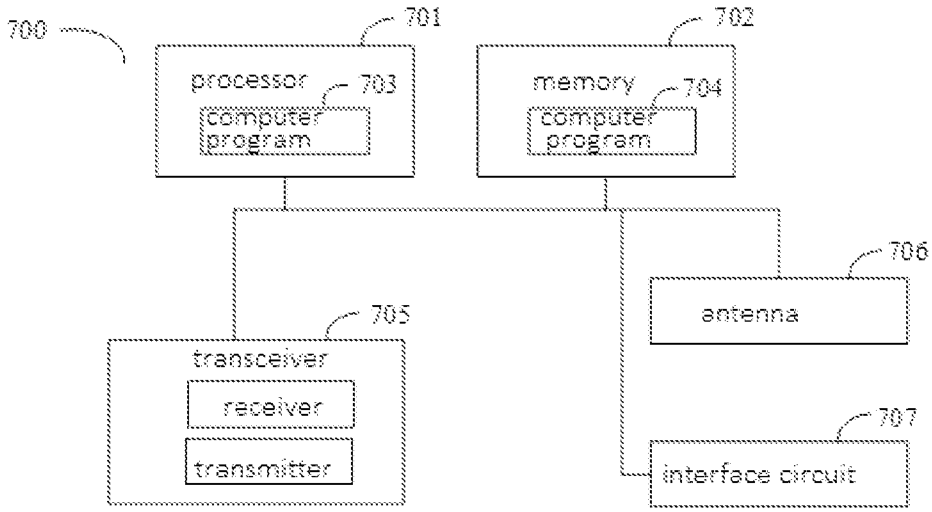
FIG. 7 is a block diagram of a communication device provided in an embodiment of the present disclosure.

Please refer to FIG. 7, which is a block diagram of another communication device provided in an embodiment of the present disclosure. The communication device 700 may be a sending terminal or a receiving terminal (such as the sending terminal or receiving terminal in the aforementioned method embodiments), and may also be a chip, chip system, or processor that supports the terminal device to implement the above method. This device can be configured to implement the methods described in the above method embodiments, as described in the above method embodiments.

The communication device 700 may include one or more processor 701. The processor 701 may be a general-purpose processor, a dedicated processor, or the like. For example, it may be a baseband processor or a central processing unit. The baseband processor can be used to process communication protocols and data, while the central processor can be used to control communication devices (such as base stations, baseband chips, terminal devices, terminal device chips, DU or CU, etc.), execute computer programs, and process data from computer programs.

Optionally, the communication device 700 may also include one or more memory 702, on which computer program 704 may be stored, and the processor 701 may execute the computer program 704 to cause the communication device 700 to execute the method described in the above method embodiments. Optionally, the memory 702 may also store data. The communication device 700 and the memory 702 may be set separately or integrated together.

Optionally, the communication device 700 may also include a transceiver 705 and an antenna 706. The transceiver 705 can be referred to as a transceiver unit, transceiver, or transceiver circuit, etc., used to achieve transceiver functions. The transceiver 705 may include a receiver and a transmitter, and the receiver can be referred to as a receiving machine or a receiving circuit, etc., for achieving reception functions; the transmitter can be referred to as a transmission machine or transmission circuit, etc., for achieving transmission functions.

Optionally, the communication device 700 may also include one or more interface circuits 707. The interface circuit 707 is configured to receive code instructions and transmit them to the processor 701. The processor 701 runs the code instructions to cause the communication device 700 to execute the method described in the above method embodiments.

The communication device 700 is a sending terminal, the processor 701 is used to execute steps S201 and S202 in FIG. 2; step S301 in FIG. 3; step S401 in FIG. 4; and the like.

The communication device 700 is a receiving terminal, the transceiver 705 is used to execute steps S501 in FIG. 5 and the like, and the processor 701 is used to execute step S502 in FIG. 5 and the like.

In one implementation, the processor 701 may include a transceiver for implementing sending and receiving functions. For example, the transceiver may be a transceiver circuit, an interface, or an interface circuit. The transceiver circuits, interfaces, or interface circuits used to achieve receiving and sending functions can be separate or integrated together. The above-mentioned transceiver circuit, interface or interface circuit can be used for reading and writing code/data, or the aforementioned transceiver circuit, interface or interface circuit can be used for signal transmission or transfer.

In one implementation, the processor 701 may store a computer program 703, which runs on the processor 701 and can cause the communication device 700 to execute the method described in the above method embodiments. The computer program 703 may be embedded in the processor 701, in which case the processor 701 may be implemented by hardware.

In one implementation, the communication device 700 may include a circuit that can achieve the functions of sending, receiving, or communicating in the aforementioned method embodiments. The processor and transceiver described in this disclosure may be implemented on integrated circuits (ICs), analog ICs, radio frequency integrated circuits (RFICs), mixed signal ICs, application specific integrated circuits (ASICs), printed circuit boards (PCBs), electronic devices, etc. The processor and transceiver can also be manufactured using various IC process technologies, such as complementary metal oxide semiconductor (CMOS), N-type metal oxide semiconductor (NMOS), P-type metal oxide semiconductor (PMOS), bipolar junction transistor (BJT) Bipolar CMOS (BiCMOS), silicon germanium (SiGe), gallium arsenide (GaAs), etc.

The communication device described in the above embodiments may be a terminal device (such as a sending terminal or a receiving terminal in the aforementioned method embodiments), but the scope of the communication device described in this application is not limited to this, and the structure of the communication device may not be limited by FIG. 7. The communication device may be an independent device or may be part of a larger device. For example, the communication device may be:

(1) independent integrated circuit IC, or chip, or chip system or subsystem;

(2) a set of one or more ICs, optionally including storage components for storing data and computer programs;

(3) ASIC, such as a modem;

(4) a module that can be embedded in other devices;

(5) a receiver, terminal device, intelligent terminal device, cellular phone, wireless device, handheld device, mobile unit, on-board device, cloud device, artificial intelligence device, etc;

(6) others and so on.

Figure 8:
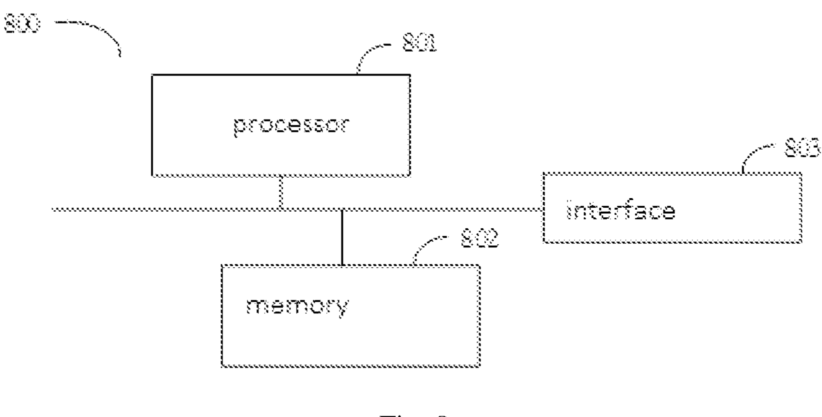
FIG. 8 is a block diagram of a chip provided in an embodiment of the present disclosure.

For the case where the communication device may be a chip or a chip system, please refer to the block diagram of the chip shown in FIG. 8. The chip 800 shown in FIG. 8 includes a processor 801 and an interface 802. The number of processors 801 may be one or more, and the number of interfaces 802 may be multiple.

For the case where the chip is used to implement the functions of the terminal device in the embodiment of the present disclosure:

The interface 802 is used for executing step S501 in FIG. 5 and the like.

Optionally, the chip 800 further includes a memory 803 for storing necessary computer programs and data.

Those skilled in the art can also understand that the various illustrative logical blocks and steps listed in the embodiments of the present disclosure can be implemented through electronic hardware, computer software, or a combination of the two. Whether such functions are implemented through hardware or software depends on the specific application and design requirements of the whole system. Technicians in this field can use various methods to achieve the described functions for each specific application, but this implementation should not be understood as exceeding the scope of protection in the embodiments of this disclosure.

Embodiments of this disclosure further provide a communication system, which includes a communication device as a sending terminal device (such as the sending terminal in the aforementioned method embodiment) in the aforementioned embodiment of FIG. 7, or a communication device as a receiving terminal device (such as the receiving terminal in the aforementioned method embodiment) in the aforementioned embodiment of FIG. 7.

The present disclosure further provides a readable storage medium on which instructions are stored, which, when executed by a computer, implement the functions of any of the above method embodiments.

This disclosure further provides a computer program product that implements the functions of any of the above method embodiments when executed by a computer.

In the above embodiments, it can be fully or partially implemented through software, hardware, firmware, or any combination thereof. When implemented using software, it can be fully or partially implemented in the form of computer program products. The computer program product includes one or more computer programs. When loading and executing the computer program on the computer, all or part of the processes or functions described in the embodiments of the present disclosure are generated. The computer may be a general-purpose computer, a specialized computer, a computer network, or other programmable devices. The computer program can be stored in a computer-readable storage medium or transmitted from one computer-readable storage medium to another, for example, the computer program may be transmitted from a website, a computer, a server or a data center to another website site, computer, server, or data center through wired (such as coaxial cable, fiber optic, digital subscriber line (DSL)) or wireless (such as infrared, wireless, microwave, etc.) methods. The computer-readable storage medium may be any available medium that the computer can access, or a data storage device such as a server or data center that includes one or more available media integrations. The available media may be magnetic media (such as floppy disks, hard drives, magnetic tapes), optical media (such as high-density digital video discs (DVDs)), or semiconductor media (such as solid state disks (SSDs)), etc.

Ordinary technical personnel in this field can understand that the first, second, and other numerical numbers involved in this disclosure are only for the convenience of description and differentiation, and are not used to limit the scope of the embodiments of this disclosure, but also indicate the order.

"At least one" of the present disclosure may also be described as one or more, and multiple may be two, three, four, or more, without limitation in this disclosure. In the embodiment of this disclosure, for a kind of technical feature, the technical features in this kind are distinguished by "first", "second", "third", "A", "B", "C", and "D", in which the technical features described in "first", "second", "third", "A", "B", "C", and "D" do not have any order of sequence or magnitude.

The correspondence relationships shown in each table in this application may be configured or predefined. The values of information in each table are only examples and may be configured to other values, which are not limited in this application. When configuring the correspondence between information and various parameters, it is not necessary to configure all the correspondence shown in each table. For example, in the table in this application, the correspondence relationships shown in certain rows may not be configured. For example, appropriate deformation adjustments can be made based on the above table, such as splitting, merging, etc. The names of the parameters shown in the titles of the above tables can also use other names that can be understood by the communication device, and the values or representations of the parameters can also be understood by the communication device. When implementing the above tables, other data structures can also be used, such as arrays, queues, containers, stacks, linear tables, pointers, linked lists, trees, graphs, structures, classes, heaps, hash tables, or hash tables.

The term predefined in this disclosure may be understood as defined, pre-defined, stored, pre-stored, pre-negotiated, pre-configured, solidified, or pre-fired.

Ordinary technical personnel in this field may realize that the units and algorithm steps of each example described in conjunction with the disclosed embodiments can be implemented in electronic hardware, or a combination of computer software and electronic hardware. Whether these functions are executed in hardware or software depends on the specific application and design constraints of the technical solution. Professional technicians may use different methods to implement the described functions for each specific application, but such implementation should not be considered beyond the scope of this application.

Technicians in the art can clearly understand that for the convenience and conciseness of the description, the specific working processes of the system, device, and unit described above can refer to the corresponding processes in the aforementioned method embodiments, and will not be repeated here.

The above is only the specific implementation of this application, but the scope of protection of this application is not limited to this. Any technical personnel familiar with this technical field can easily think of changes or replacements within the scope of technology disclosed in this application, which should be covered within the scope of protection of this application. Therefore, the protection scope of this application should be based on the protection scope of the claims.

What is claimed is:

1. A method for determining an activation state of a terminal, performed by a sending terminal, comprising:

determining a state of a first-type local timer on the sending terminal corresponding to a receiving terminal, wherein the receiving terminal is a terminal communicating with the sending terminal via a sidelink; and determining the activation state of the receiving terminal based on the state of the first-type local timer, wherein the method further comprises:

stopping a running of the first-type local timer, in response to the sending terminal sending a sidelink discontinuous reception (DRX) medium access control (MAC)

control element (CE) to the receiving terminal, wherein the sidelink DRX MAC CE is configured to instruct the receiving terminal to enter an inactive state.

2. The method of claim 1, further comprising:

determining that the receiving terminal is in an active state, in response to the first-type local timer being in a running state; or determining that the receiving terminal is in an inactive state, in response to the first-type local timer being in a stopped state.

3. The method of claim 1, further comprising:

stopping a running of the first-type local timer, in response to receiving indication information sent by the receiving terminal, wherein the indication information is sent by the receiving terminal when entering an inactive state.

4. The method of claim 3, wherein the indication information is triggered and sent by the receiving terminal when the receiving terminal is unable to monitor a sidelink communication channel during a running of a second-type local timer of the receiving terminal.

5. The method of claim 1, wherein the first-type local timer comprises at least one of: an inactive timer, a wakeup timer or a retransmission timer.

6. A method for determining an activation state of a terminal, performed by a receiving terminal, comprising:

sending indication information to a sending terminal, wherein the indication information is configured to indicate that the receiving terminal enters an inactive state, and wherein the sending terminal is a terminal communicating with the receiving terminal via a sidelink, wherein the method further comprises:

receiving a sidelink discontinuous reception (DRX) medium access control (MAC) control element (CE) sent by the sending terminal, wherein the sidelink DRX MAC CE is configured to instruct the receiving terminal to enter the inactive state, wherein the sending terminal stops a running of a first-type local timer on the sending terminal corresponding to the receiving terminal, in response to sending the sidelink DRX MAC CE to the receiving terminal.

7. The method of claim 6, further comprising:

stopping a running of a second-type local timer on the receiving terminal directly after sending the indication information to the sending terminal; or receiving feedback information fed back by the sending terminal indicating successful reception of the indication information, and stopping a running of a second-type local timer on the receiving terminal.

8. The method of claim 6, further comprising:

sending the indication information to the sending terminal, in response to the receiving terminal being unable to monitor a sidelink communication channel during a running of a second-type local timer.

9. A communication device, comprising:

a processor, configured to determine a state of a first-type local timer on a sending terminal corresponding to a receiving terminal, and determine an activation state of the receiving terminal according to the state of the first-type local timer, wherein the receiving terminal is a terminal communicating with the sending terminal via a sidelink, wherein the processor is further configured to stop a running of the first-type local timer, in response to the sending terminal sending a sidelink discontinuous reception (DRX) medium access control (MAC) control element (CE) to the receiving terminal, wherein the sidelink DRX MAC CE is configured to instruct the receiving terminal to enter an inactive state.

10. A communication device, comprising:

a transceiver configured to perform the method of claim 6.

* * * * *